United States Patent
Boyd

(10) Patent No.: US 6,918,603 B2
(45) Date of Patent: Jul. 19, 2005

(54) SCRUB-MATE

(76) Inventor: George Martin Boyd, 2835 Benton Blvd., Kansas City, MO (US) 64128

( * ) Notice: Subject to any disclaimer, the term of this patent is extended or adjusted under 35 U.S.C. 154(b) by 71 days.

(21) Appl. No.: 10/378,727

(22) Filed: Mar. 5, 2003

(65) Prior Publication Data

US 2003/0227146 A1 Dec. 11, 2003

Related U.S. Application Data

(60) Provisional application No. 60/386,836, filed on Jun. 10, 2002.

(51) Int. Cl.$^7$ .............................................. B62D 63/00
(52) U.S. Cl. ..................................... 280/32.7; 15/340.1
(58) Field of Search ............................. 280/32.7, 47.38, 280/47.4, 79.2; 297/217.1, 217.7, DIG. 4; 180/22; 15/340.1, 246.4, 49.1, 246

(56) References Cited

U.S. PATENT DOCUMENTS

| | | | | |
|---|---|---|---|---|
| 1,652,065 A | * | 12/1927 | Tascarella ....................... 5/600 |
| 2,678,462 A | * | 5/1954 | Lison et al. .................... 15/349 |
| 3,190,672 A | * | 6/1965 | Swanson et al. ............ 280/32.7 |
| 4,010,507 A | * | 3/1977 | Johnson ....................... 15/49.1 |
| 4,513,832 A | * | 4/1985 | Engman ....................... 180/6.5 |
| 4,998,948 A | * | 3/1991 | Osterling .................... 56/12.6 |
| 5,947,490 A | * | 9/1999 | Munnoch et al. ........... 280/32.7 |

* cited by examiner

Primary Examiner—Bryan Fischmann
(74) Attorney, Agent, or Firm—Chase Law Firm, L.C.

(57) ABSTRACT

A novel solution for converting a walk behind floor scrubber into a sit and ride behind floor scrubber. The present invention consists of a chassis frame to which five wheels are attached. Two of the front wheels pivot and the up-front safety wheel does not. The wheels that are attached to the rear of the frame, are non-pivotal. A person sits on the cushioned seat. Upon grabbing the floor scrubber's control handles and rotating them forward the floor scrubber, as it propels forward, pulls the present invention behind it in tandem. This allows the operator for the floor scrubber to sit and rid instead of walking, while cleaning large commercial size floors. This new procedure saves enormous time and the person controlling the scrubber will be less fatigued from hours of walking. The Scrub-mate is new to the floor cleaning industry, because it eliminates walking of the operator while using a battery-powered walk behind floor scrubber.

1 Claim, 7 Drawing Sheets

SCRUB-MATE

This application claims the benefits of U.S. provisional application Ser. No. 60/386,836, filed on Jun. 10, 2002.

BACKGROUND OF THE INVENTION

The new invention pertains to the field of commercial floor cleaning, in particular, the enhanced use of a battery powered walk-behind floor scrubber. I call my invention the Scrub-mate. It is a mobile sitting unit with five wheels, which eliminates the walking when using this type of commercial floor scrubber. The past and present ways of using a walk-behind floor scrubber are having a person rotate the control handles forward while walking behind the floor scrubber. It can be a two to three hour process and cause fatigue. The Scrub-mate, with its up-front safety wheel, will cut the job time in half and eliminates walking. This will allow the owners of walk-behind floor scrubbers, to be as efficient as the more expensive one piece riding scrubber. The safety wheel is in place to keep the Scrub-mate from tipping over forward when objects are encountered while scrubbing commercial floors.

BRIEF SUMMARY OF THE INVENTION

The Scrub-mate converts a walk-behind floor scrubber into a sit and ride behind floor scrubber, allowing the owners of walk-behind floor scrubbers to be as efficient as the more expensive one piece unit riding scrubber, but at a much lower cost.

Controlled by the operator of the walk-behind floor scrubber, this mobile sitting unit with a saftey wheel, follows the floor scrubber in tandem. The only connection between the floor scrubber and the Scrub-mate is the operators' hands and arms.

The major advantages of the Scrub-mate are no more walking for hours, and a faster, steadier pace, which will cut the job completion time in half.

DETAILED DESCRIPTION OF THE INVENTION

Figure 1:
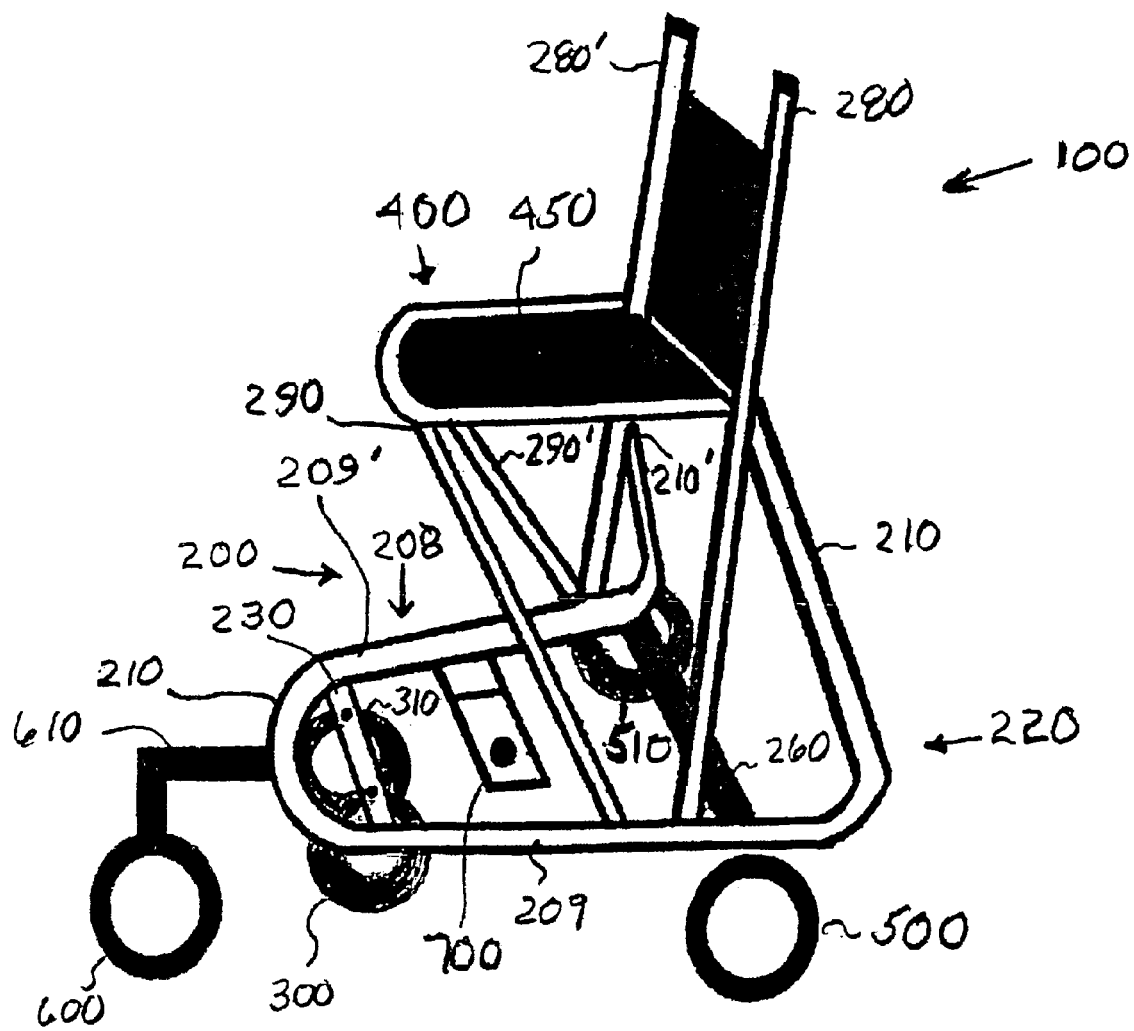
FIG. 1 is a side view of Scrub-mate.
Figure 2:
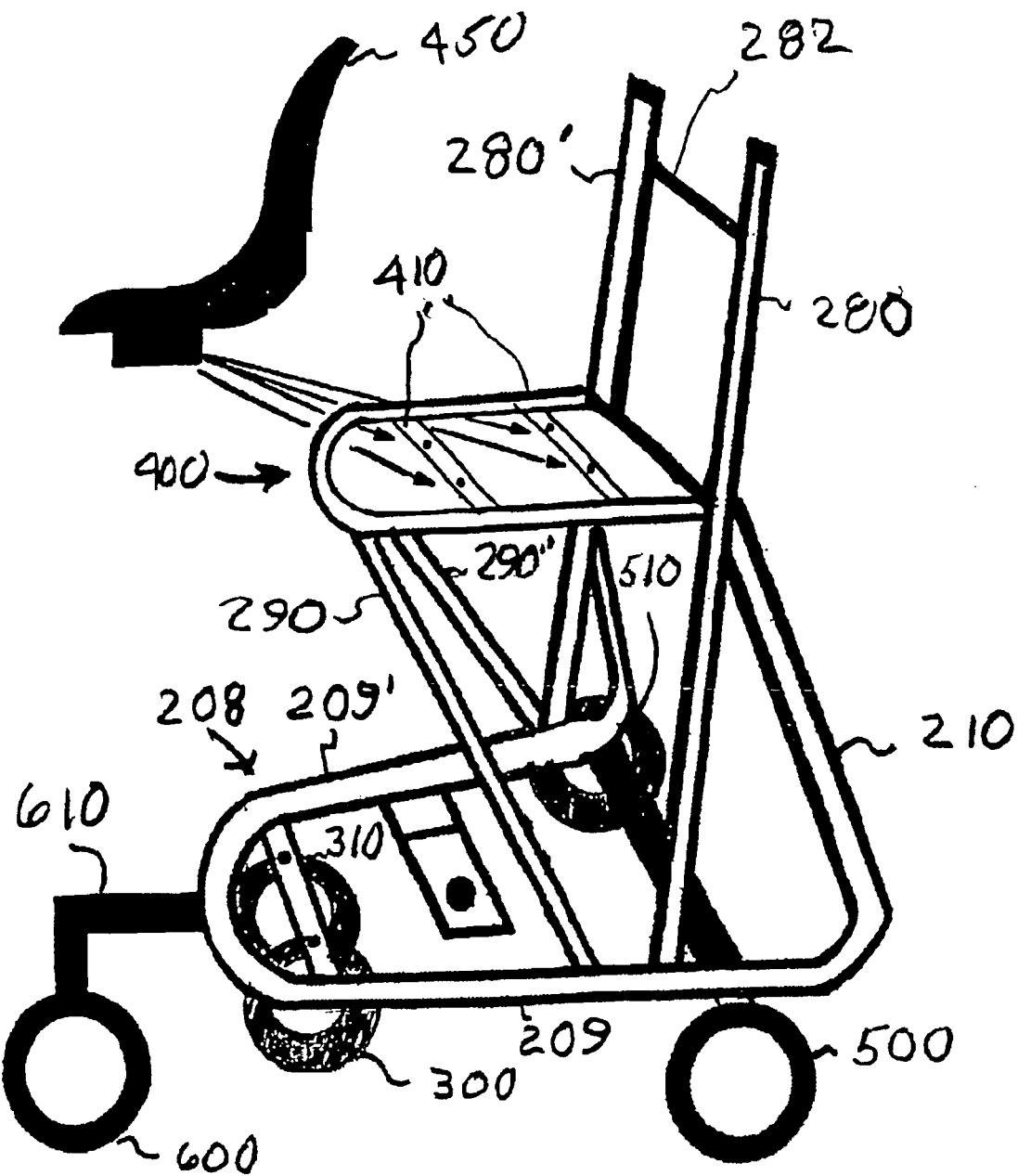
FIG. 2 is a side view of Scrub-mate and where the cushioned seat is exploded from its bolted position into the steel cross straps.
Figure 3:
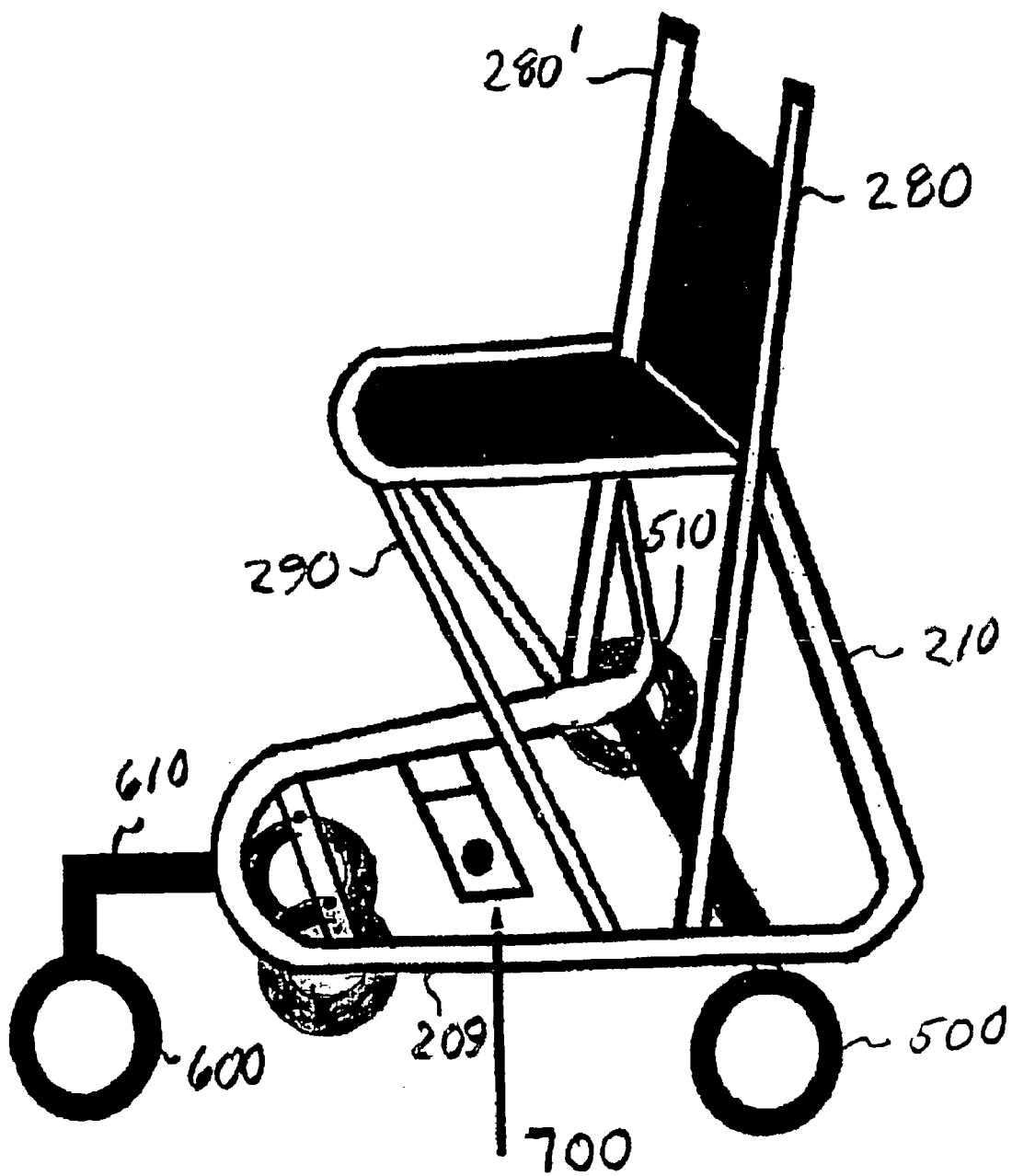
FIG. 3 is a side view of Scrub-mate, as shown in FIG. 2, and indicating with an arrow the location of the utility tray and cup holder.

The Scrub-mate 100 is a mobile sitting unit that will convert a walk-behind floor scrubber 1000 into a sit and ride behind floor scrubber. This brings about two major improvements to the use of this type of commercial floor scrubber. First, walking is eliminated. Second, the time it takes to complete a job will be cut in half.

The process of using a walk-behind floor scrubber is that a person rotates the control handles 1010 of the floor scrubber 1000 forward, and the machine goes forward. The pace is slow and the person operating the scrubber gets fatigued. This fatigue comes from walking on hard concrete or linoleum floors for two hours or more.

With the Scrub-mate 100, the pace of the floor scrubber is now faster and steadier. The water solution that is dispersed by the floor scrubber will now be used more efficiently.

The walk-behind floor scrubber's cost plus the cost of the Scrub-mate is far less expensive than the price of a one piece riding scrubber. This will be a financial benefit to many owners of this type of commercial floor scrubber.

The Scrub-mate is made of 21 feet of ⅝ inch steel pipe. The lower portion of the main frame 200 of this unit is bent into the shape of the letter U. This is done by using a bending machine. The front 210 of the U-shaped frame is 13 inches in width. The back end 220 of the U-shaped frame is 21½ inches in width. The U-shaped frame flares outward at its' rear 220. The length of the U-shaped frame is 23 inches, right and left sides. At the rear, the frame curves upward right 210 and left 210' sides, at an 85 degree angle. The length of these right and left sides is 17 inches. The lower frame 208 is a total of 98 inches of a single pipe, curved at four different angles.

Figure 6:
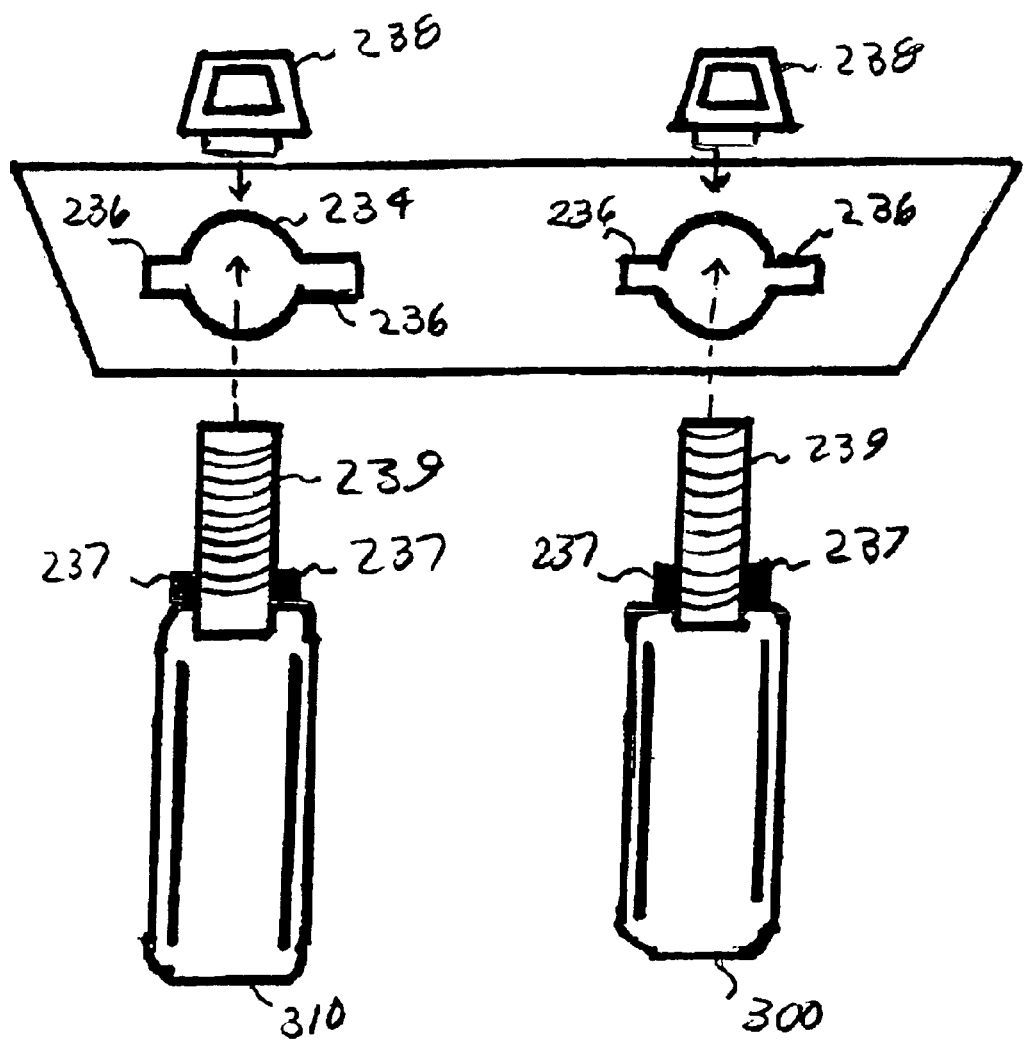
FIG. 6 is a detailed view of how front rotating wheels bolts, fit into the slotted holes in front cross bar with the bolt caps exploded therefrom.
Figure 7:
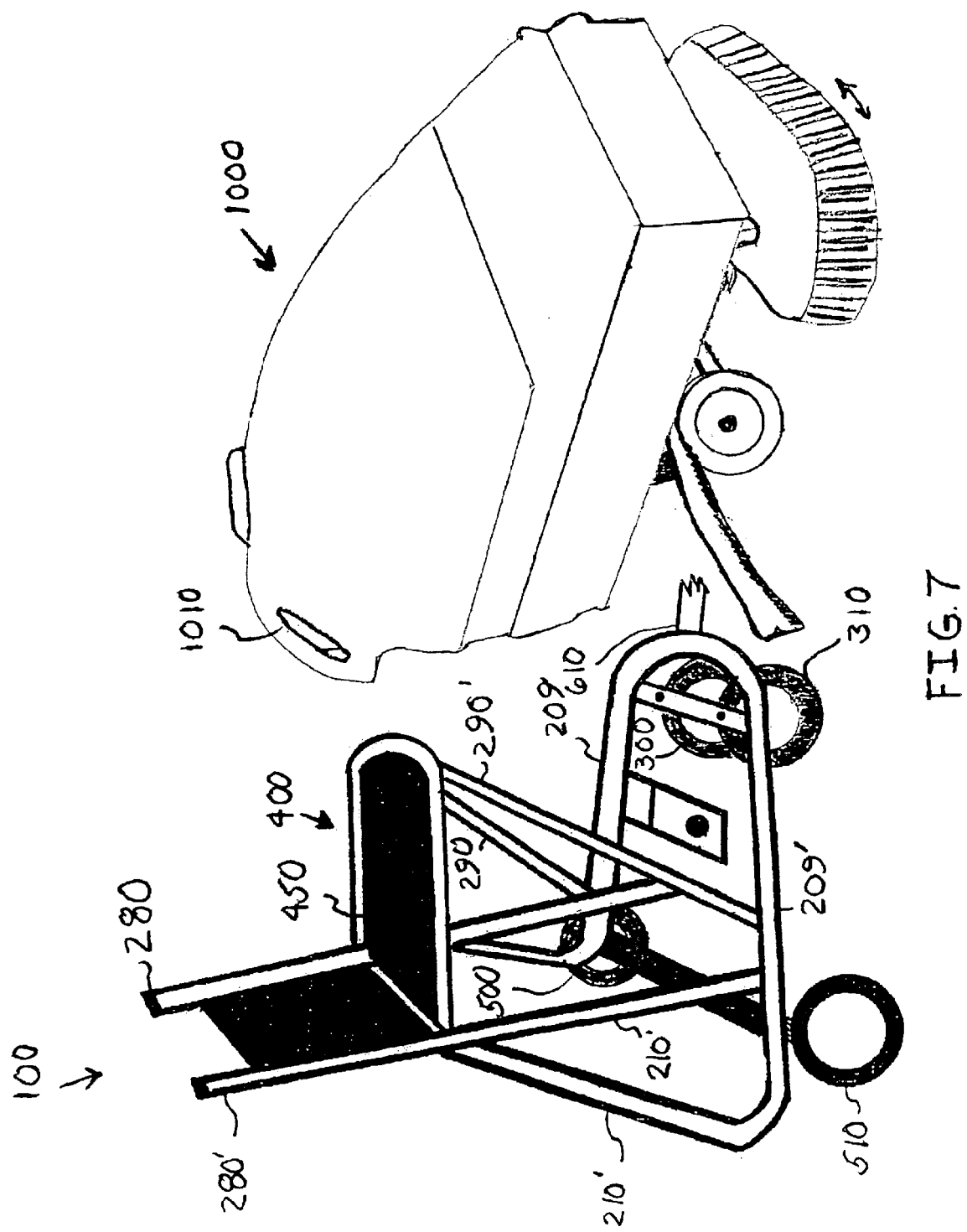
FIG. 7 is a view showing the unit behind a floor scrubber, the safety wheel broken away for purposes of illustration.

The next step is to weld a crossbar 230 to the underneath side of the front of the lower frame 208, 1 inch back from the front end 210. This flat cross bar 230 is 2½ inches wide and 13½ inches in length, and is in place for several reasons. One, the crossbar 230 is in place the two front pivotal wheels 300, 310 are bolted thereto (FIG. 6). Two, the cross bar 230 secures the front end 210 of the lower frame 208 and can be used for a footrest.

Figure 4:
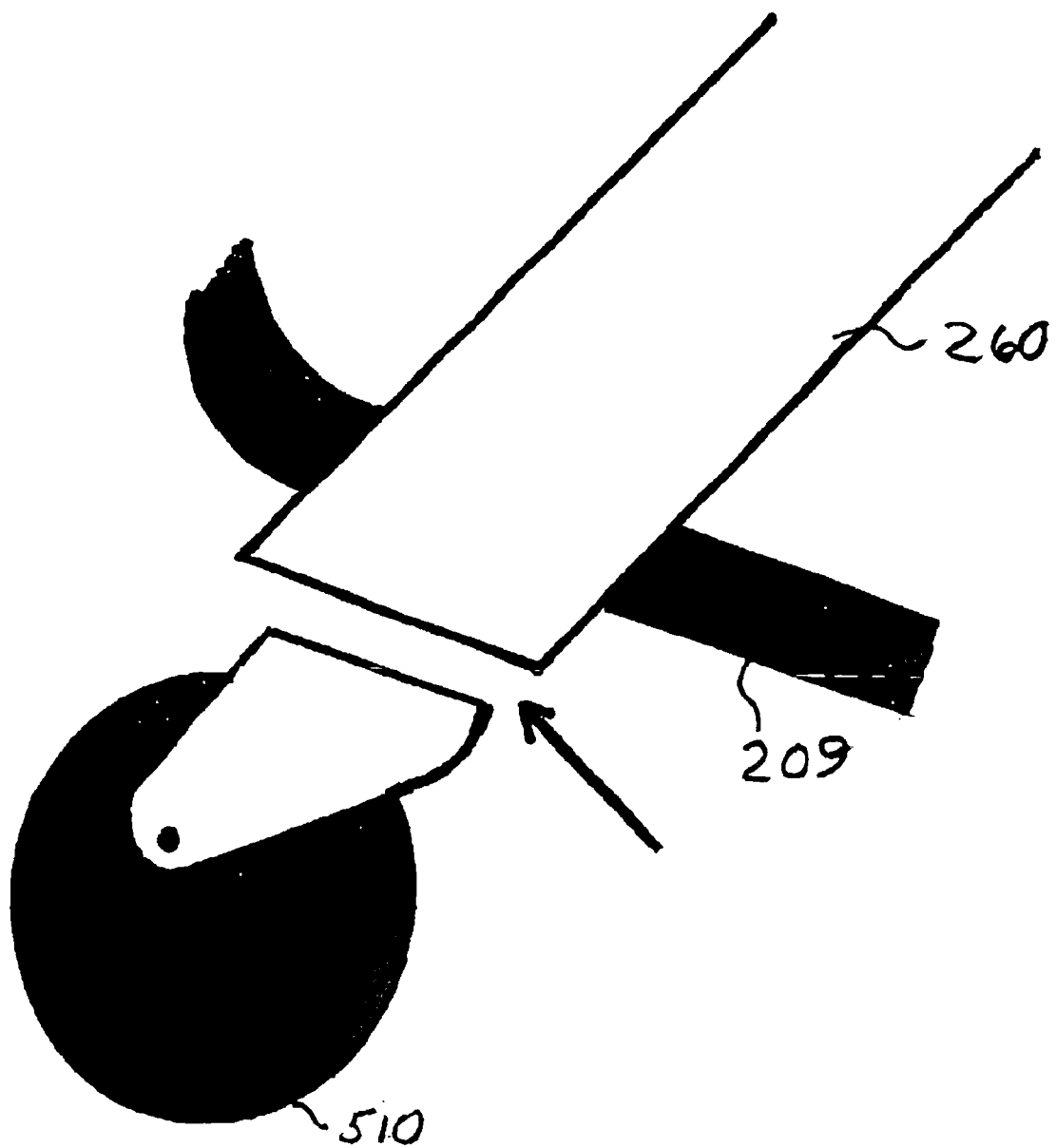
FIG. 4 is a detailed view of where the rear stationery, rotatable wheels are welded to underneath side of a rear cross bar.

A rear crossbar 260 is welded to the underneath side of the rear 220 of the lower frame 208. This crossbar is 21 inches in length and 2½ inches wide. This steel crossbar 260 is where the rear stationery wheels 500, 510 are welded, 21 inches apart (FIG. 4). This crossbar 260 also secures the rear end of the frame. Its' placement is 15 inches back from the front crossbar 230.

Two support poles 280, 280' 30 inches in length, are welded to the insides of the upstanding struts 210, 210' back ends of the frame, that curves upward, right and left sides. The bottom end of each of these two support poles 280, 280' is welded to the top of the horizontal struts 209, 209' of the lower frame 208, right and left sides, which creates a 96 degree angle.

A 42-inch piece of ½ inch square steel, is used for the seat frame 400. It is bent into the shape of the letter U. This is done by using a bending machine. This seat frame 400 is welded to the two 30 inch back support poles 280, 280', 18½ inches up from the lower U-shaped frame 208. Across the seat frame 400 two steel straps 410 are welded in place. They are there in order to bolt the durable plastic seat 450 thereto. These steel straps 410, are 19 inches in length and 1½ inches wide. There are two holes 420 drilled in each strap 410, 5 inches apart. Four bolts and four T-bolts (not shown) are used to secure the seat to the seat frame 400.

A piece of ⅝ inch pipe 282, 21 inches in length, is welded between the upper portion of the two rear 30 inch back support poles 280, 280'. This pole 282 is welded in place 1 inch down from the top of the unit. It is in place for back and structure support.

Two 19 inch seat support poles 290, 290' are welded in extension between the bottom of the seat frame 400 and the lower frame, 208 at a 65 degree angle, right and left sides. They are in place for seat support.

To attach the two front pivotal wheels 300, 310 to the front crossbar 230 two ¼ inch holes 234 are drilled, 8½ inches apart (FIG. 6). In these holes, 234, side grooves 236 are cut in, on opposite sides. This is done by using a punching machine. The bolts 239 of these pivotal wheels have side extensions/ridges 237 which extend into these side grooves 236 upon extension of bolts 239 through apertures 234. In order to tighten the caps 239 onto bolts 239 without the bolts 239 turning, these grooves 236 are necessary.

Figure 5:
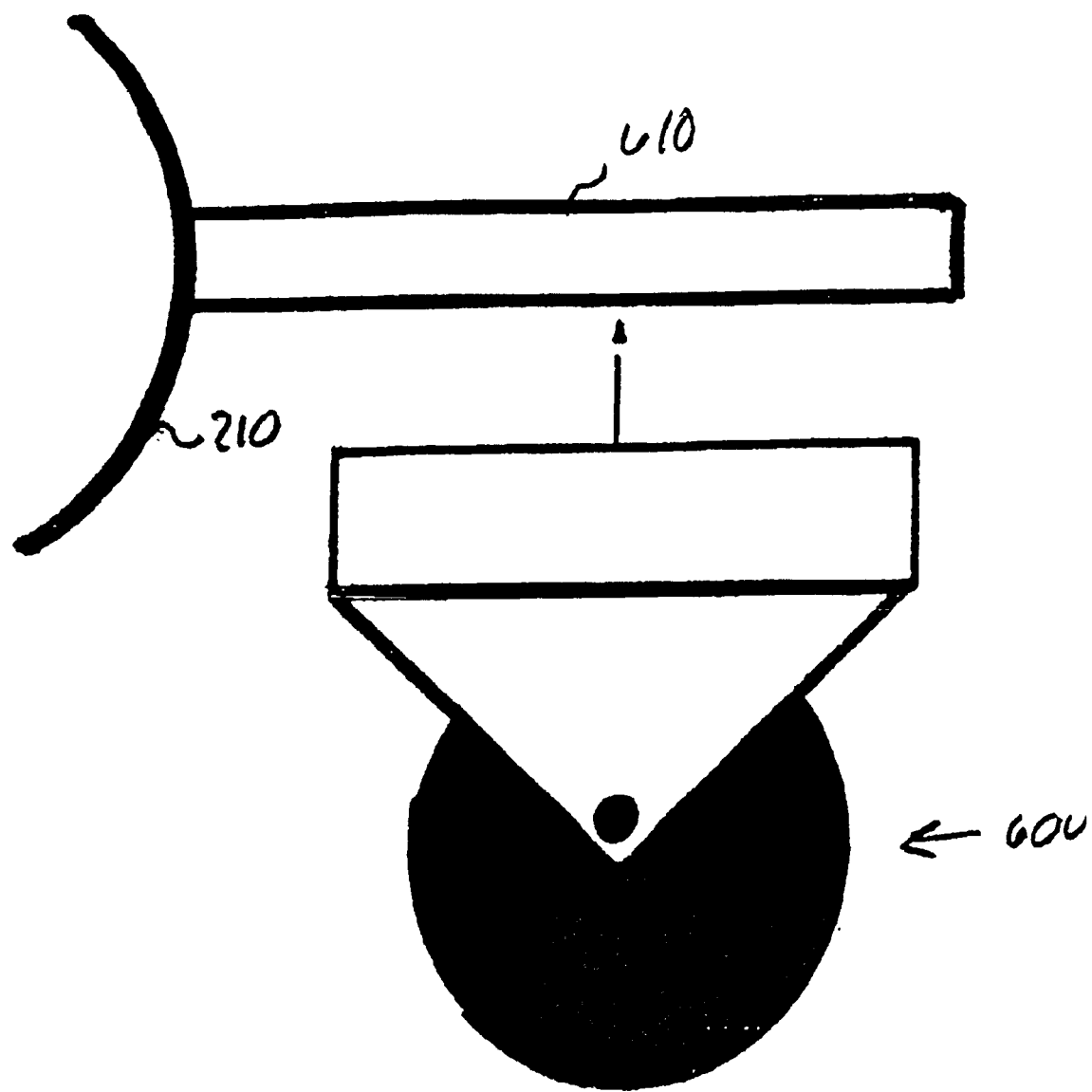
FIG. 5 is a detailed view of up-front safety wheel and harness, and where it is welded to the front end bracket.

The front non-pivotal safety wheel 600 is located on the front end of the frame. It is welded to a 7-inch long steel bracket 610 (FIG. 5). This wheel 600 is ¼ of an inch higher off the ground than the other four wheels. The purpose is to keep the Scrub-mate from tipping forward, when the Scrub-mate runs over objects on the floor such as: rugs, floor drains, electrical cords, floor dividers. This wheel is very important for balance.

The rear wheels 500, 510 are welded to the underneath side of the rear crossbar 260, right and left sides (FIG. 4). These wheels 500, 510 are stationery i.e., they do not pivot. They are 16 inches apart. All wheels are made of rubber, and the diameter of each wheel is 5 inches.

The procedure for stopping the new invention is simple. When the operator releases the control handles of the floor scrubber 1000, both the floor scrubber and Scrub-mate stop. The Scrub-mate also has a utility tray 700 with a cup holder located on the frame below the seat.

In conclusion, this new invention the Scrub-mate, will be a benefit to the owners of new and/or used walk behind floor scrubbers, by converting them into a two piece riding scrubber, with several benefits. When the walk behind floor scrubber was produced, the operator walked. But in this competitive society, the need for speed and efficiency is of utmost importance. The said invention modifies the typical use of a walk behind floor scrubber with the addition of speed and efficiency. The Scrub-mate is safe and durable.

What is claimed is:

1. A five wheeled mobile sitting unit, which converts a battery powered walk behind floor scrubber, into a two-piece riding floor scrubber comprising;

a) a frame with a front and a back end, b) a front end wheel assembly comprising of two pivotal wheels and an up front non-pivoting safety wheel, c) an up front bracket on said frame for supporting said up front non-pivoting safety wheel, d) said safety wheel on said bracket, for added balance, and is positioned an at least ¼ of an inch off the ground, e) a set of non-pivotal wheels are on the rear said back end of said frame, f) An a utility tray and or cup holder are located on a lower portion of said frame, g) a durable seat with cushioned insert on said seat frame, on main frame, said seat adapted for a user sitting thereon, a grasping of the floor scrubber by the user coupling said unit to the scrubber for movement therewith.

\* \* \* \* \*